US012687898B2

(12) United States Patent  
Xia et al.

(10) Patent No.: US 12,687,898 B2  
(45) Date of Patent: Jul. 21, 2026

(54) FOLDABLE APPARATUS AND ELECTRONIC DEVICE TO FOLDABLE APPARATUS FOR SUPPORTING FLEXIBLE DISPLAY SCREEN, AND ELECTRONIC DEVICE INCLUDING THE SAME

(71) Applicant: Shanghai Tianma Micro-Electronics Co., Ltd., Shanghai (CN)

(72) Inventors: Haoyang Xia, Shanghai (CN); Tianqi Huang, Shanghai (CN); Renhao Pan, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 423 days.

(21) Appl. No.: 18/491,979

(22) Filed: Oct. 23, 2023

(65) Prior Publication Data

US 2024/0077916 A1 Mar. 7, 2024

(30) Foreign Application Priority Data

Jun. 27, 2023 (CN) .......................... 202310768716.5

(51) Int. Cl.  
*G06F 1/16* (2006.01)

(52) U.S. Cl.  
CPC .......... *G06F 1/1681* (2013.01); *G06F 1/1652* (2013.01)

(58) Field of Classification Search  
CPC .... G06F 1/1681; G06F 1/1652; G06F 1/1624; G06F 1/1616; F16M 13/005; F16C 11/04;  
(Continued)

(56) References Cited

U.S. PATENT DOCUMENTS 9,519,313 B2 * 12/2016 Kim ........................ G06F 1/166  
9,980,373 B2 * 5/2018 Jeong ..................... H05K 1/028  
(Continued)

FOREIGN PATENT DOCUMENTS

CN 109495621 A 3/2019  
CN 113870692 A 12/2021  
CN 114257665 A 3/2022

OTHER PUBLICATIONS

First Chinese Office Action mailed on Aug. 14, 2025, issued in Chinese Application No. 202310768716.5; 16 pages.  
(Continued)

*Primary Examiner* — Rockshana D Chowdhury  
(74) *Attorney, Agent, or Firm* — CHRISTENSEN O'CONNOR JOHNSON KINDNESS PLLC

(57) ABSTRACT

A foldable apparatus for supporting a flexible display screen includes a spindle assembly and two rotating components. At least one of the two rotating components is a first rotating component that includes a middle frame, a rotating holder, and a transmission structure. The rotating holder is rotatably connected to the spindle assembly. The middle frame is located at a side of the rotating holder away from the spindle assembly. The middle frame and the rotating holder is configured to slide in parallel. The transmission structure has one end connected to the spindle assembly and another end connected to the middle frame. The middle frame is configured to adhere to the flexible display screen. When the first rotating component rotates relative to the spindle assembly, the transmission structure moves relative to the rotating holder and drives the middle frame to slide in parallel relative to the rotating holder.

25 Claims, 8 Drawing Sheets

(58) Field of Classification Search

CPC .... F16C 2370/00; F16C 2380/00; G09F 9/30;
G09F 9/301; H05K 5/0018; H05K 5/0217

See application file for complete search history.

(56) References Cited

U.S. PATENT DOCUMENTS

| | | | | |
|---|---|---|---|---|
| 10,747,269 B1 * | 8/2020 | Choi | | G06F 1/1652 |
| 10,820,433 B2 * | 10/2020 | Cha | | H05K 5/0226 |
| 10,866,614 B2 * | 12/2020 | Lee | | H04M 1/0268 |
| 11,003,217 B2 * | 5/2021 | Cha | | G06F 1/1681 |
| 11,249,518 B2 * | 2/2022 | Liao | | G06F 1/1658 |
| 11,315,443 B2 * | 4/2022 | Han | | G06F 1/1624 |
| 11,416,036 B2 * | 8/2022 | Yin | | G06F 1/1652 |
| 11,540,407 B2 * | 12/2022 | Zhang | | H05K 5/0017 |
| 11,689,651 B2 * | 6/2023 | Feng | | H04M 1/0237 |
| | | | | 455/566 |
| 11,720,147 B2 * | 8/2023 | Prushinskiy | | G06F 1/1624 |
| | | | | 361/679.27 |
| 11,768,519 B2 * | 9/2023 | Feng | | G06F 1/1637 |
| | | | | 361/679.27 |
| 11,800,657 B2 * | 10/2023 | Jiang | | G06F 1/1637 |
| 11,805,606 B2 * | 10/2023 | Choi | | G02F 1/133308 |
| 11,809,231 B2 * | 11/2023 | Feng | | G06F 1/1652 |
| 11,832,406 B2 * | 11/2023 | Kim | | G06F 1/1624 |
| 11,860,694 B2 * | 1/2024 | Shin | | G06F 1/1637 |
| 11,910,549 B2 * | 2/2024 | Ko | | G06F 1/1624 |
| 11,921,545 B2 * | 3/2024 | Feng | | H04M 1/0268 |
| 11,974,406 B2 * | 4/2024 | Lee | | G06F 1/1637 |
| 12,016,142 B2 * | 6/2024 | Jiang | | G09F 9/301 |
| 12,041,193 B2 * | 7/2024 | Cha | | G06F 1/1652 |
| 12,073,751 B2 * | 8/2024 | Park | | G06F 1/1652 |
| 12,107,979 B2 * | 10/2024 | Lee | | G06F 1/1652 |
| 12,127,360 B2 * | 10/2024 | Cheng | | H04M 1/0216 |
| 12,150,256 B2 * | 11/2024 | Rothkopf | | H05K 5/0217 |
| 12,156,461 B2 * | 11/2024 | Wang | | H10K 77/111 |
| 12,181,917 B2 * | 12/2024 | Shin | | G06F 1/1624 |
| 12,204,377 B2 * | 1/2025 | Han | | G06F 1/1652 |
| 12,222,764 B2 * | 2/2025 | Chen | | G06F 1/1675 |
| 12,341,918 B2 * | 6/2025 | Hou | | G09F 9/301 |
| 12,375,593 B2 * | 7/2025 | Choi | | G06F 1/1652 |
| 2013/0058063 A1 * | 3/2013 | O'Brien | | G06F 1/1624 |
| | | | | 361/807 |
| 2018/0077808 A1 * | 3/2018 | Seo | | G06F 3/04164 |
| 2018/0188778 A1 * | 7/2018 | Shin | | G06F 1/1652 |
| 2021/0373603 A1 * | 12/2021 | Feng | | G06F 1/1624 |
| 2021/0383727 A1 * | 12/2021 | Han | | G06F 1/1656 |
| 2022/0039273 A1 * | 2/2022 | Zhang | | G06F 1/1616 |
| 2022/0253103 A1 * | 8/2022 | Choi | | G06F 1/1624 |
| 2022/0254281 A1 * | 8/2022 | Zhang | | G06F 1/1601 |
| 2022/0322551 A1 * | 10/2022 | Cheng | | H05K 5/0217 |
| 2022/0322553 A1 * | 10/2022 | Zhang | | G09F 9/301 |
| 2023/0208959 A1 * | 6/2023 | Yen | | H05K 5/0217 |
| | | | | 455/566 |
| 2023/0213967 A1 * | 7/2023 | Kang | | G06F 1/1624 |
| | | | | 455/575.4 |
| 2024/0077916 A1 * | 3/2024 | Xia | | G06F 1/1652 |
| 2024/0276658 A1 * | 8/2024 | Zhou | | G09F 9/30 |

OTHER PUBLICATIONS

Chinese Office Action mailed on Feb. 26, 2026, issued in Chinese Application No. 202310768716.5; 15 pages.

* cited by examiner

FOLDABLE APPARATUS AND ELECTRONIC DEVICE TO FOLDABLE APPARATUS FOR SUPPORTING FLEXIBLE DISPLAY SCREEN, AND ELECTRONIC DEVICE INCLUDING THE SAME

CROSS-REFERENCE TO RELATED APPLICATIONS

The present application claims priority to Chinese Patent Application No. 202310768716.5, filed on Jun. 27, 2023, the content of which is incorporated herein by reference in its entirety.

TECHNICAL FIELD

The present disclosure relates to the field of display technologies, and in particular, to a foldable apparatus and an electronic device.

BACKGROUND

With the development of flexible display screen technologies, applications of flexible display screens are gradually increasing. Foldable electronic devices are an application of flexible display screen technologies. Conventionally, various multi-body linkage mechanisms are used to manufacture a foldable apparatus for supporting a flexible display screen. However, even with such multi-body linkage mechanisms, the following problem still cannot be addressed: the flexible display screen is stretched or squeezed when an electronic device is unfolded and folded, affecting a service life of the flexible display screen.

SUMMARY

In a first aspect, the present disclosure provides a foldable apparatus for supporting a flexible display screen. In an embodiment, the foldable apparatus includes: a spindle assembly and two rotating components. In an embodiment, the foldable apparatus has an unfolding state and a folding state, the two rotating components are located at two sides of the spindle assembly in the unfolding state, and the two rotating components are stacked in the folding state. In an embodiment, at least one of the two rotating components is a first rotating component including a middle frame, a rotating holder, and a transmission structure; and the rotating holder is rotatably connected to the spindle assembly, the middle frame is located at a side of the rotating holder away from the spindle assembly, the middle frame and the rotating holder are configured to slide in parallel, the transmission structure has one end connected to the spindle assembly and another end connected to the middle frame, and the middle frame is configured to adhere to the flexible display screen. In an embodiment, when the first rotating component rotates relative to the spindle assembly, the transmission structure moves relative to the rotating holder and drives the middle frame to slide in parallel relative to the rotating holder.

In a second aspect, the present disclosure provides an electronic device. The electronic device includes a flexible display screen and a foldable apparatus for supporting the flexible display screen. In an embodiment, the foldable apparatus includes: a spindle assembly and two rotating components. In an embodiment, the foldable apparatus has an unfolding state and a folding state, the two rotating components are located at two sides of the spindle assembly in the unfolding state, and the two rotating components are stacked in the folding state. In an embodiment, at least one of the two rotating components is a first rotating component including a middle frame, a rotating holder, and a transmission structure; and the rotating holder is rotatably connected to the spindle assembly, the middle frame is located at a side of the rotating holder away from the spindle assembly, the middle frame and the rotating holder are configured to slide in parallel, the transmission structure has one end connected to the spindle assembly and another end connected to the middle frame, and the middle frame is configured to adhere to the flexible display screen. In an embodiment, when the first rotating component rotates relative to the spindle assembly, the transmission structure moves relative to the rotating holder and drives the middle frame to slide in parallel relative to the rotating holder.

BRIEF DESCRIPTION OF DRAWINGS

In order to more clearly explain the embodiments of the present disclosure or the technical solution in the related art, the drawings to be used in the description of the embodiments or the related art will be briefly described below. The drawings in the following description are some embodiments of the present disclosure. For those skilled in the art, other drawings may also be obtained based on these drawings.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure shall fall into the protection scope of the present disclosure.

The terms used in the embodiments of the present disclosure are merely for the purpose of describing a specific embodiment, rather than limiting the present disclosure. The terms "a", "an", "the" and "said" in a singular form in the embodiment of the present disclosure and the attached claims are also intended to include plural forms thereof, unless noted otherwise.

To solve a problem in the related art, the embodiments of the present disclosure provide a foldable apparatus for supporting a flexible display screen. A rotating component rotatably connected to a spindle assembly in the foldable apparatus is designed. A total length of at least one rotating component is set to be variable along with an unfolding state and a folding state of the foldable apparatus so that a length of a supporting surface of the foldable apparatus can adapt to a length of the flexible display screen in both the unfolding state and the folding state, so that the flexible display screen is not squeezed or stretched when folded, avoiding damage to the flexible display screen and ensuring a service life of the flexible display screen.

Figure 1:
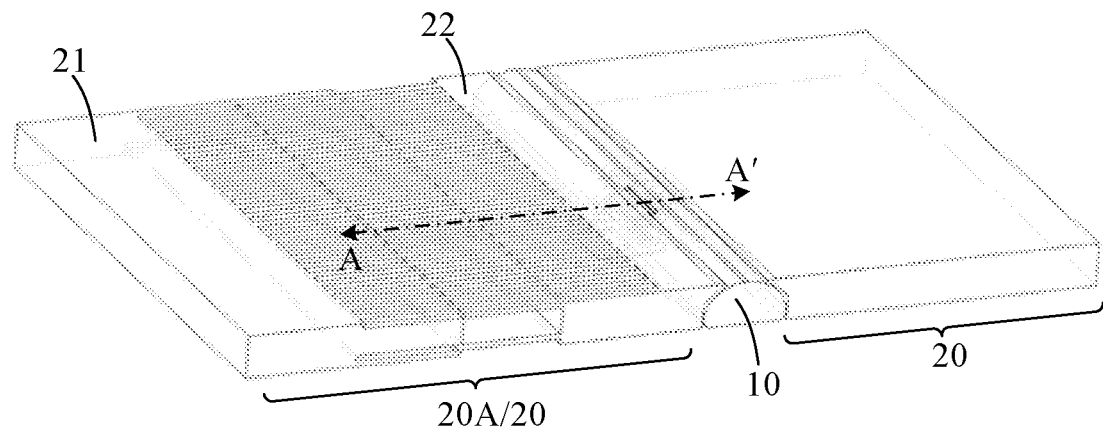
FIG. 1 is a schematic diagram of a foldable apparatus according to an embodiment of the present disclosure.
Figure 2:
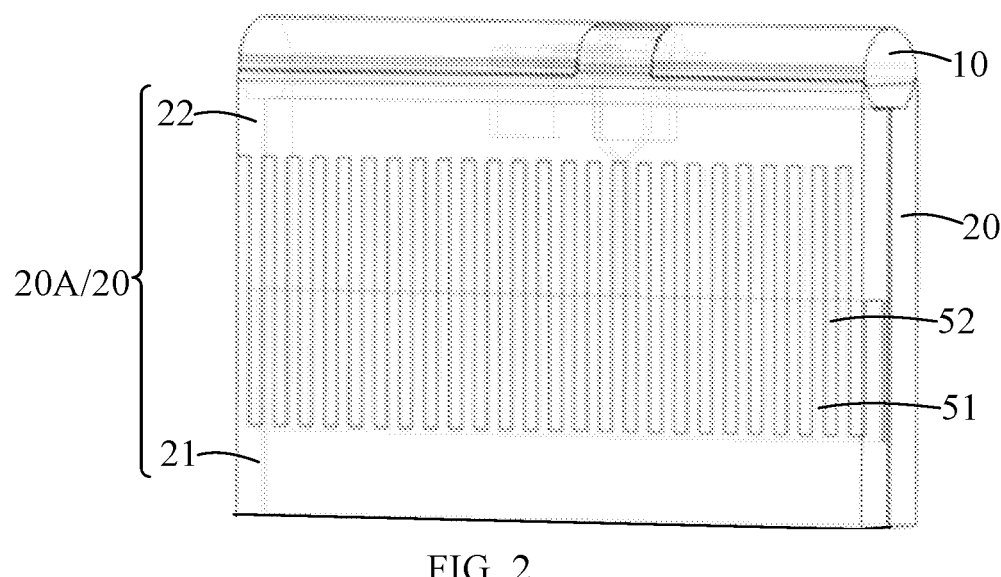
FIG. 2 is a schematic diagram of a foldable apparatus according to another embodiment of the present disclosure.
Figure 3:
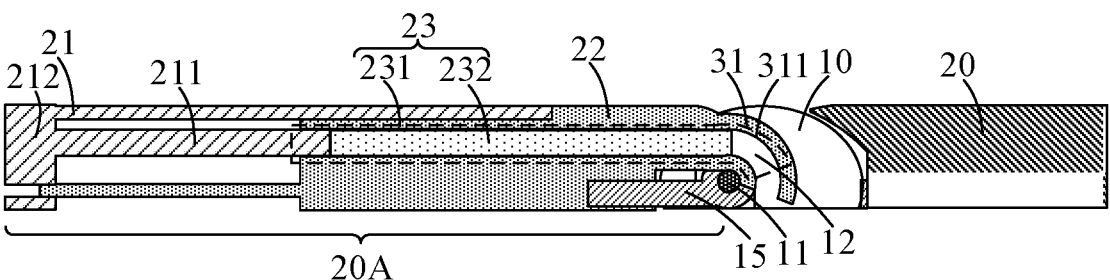
FIG. 3 is a schematic cross-sectional view along line A-A' in FIG. 1 according to an embodiment of the present disclosure.

FIG. 1 is a schematic diagram of a foldable apparatus according to an embodiment of the present disclosure. FIG. 2 is a schematic diagram of a foldable apparatus according to another embodiment of the present disclosure. FIG. 1 shows an unfolding state of the foldable apparatus. FIG. 2 shows a folding state of the foldable apparatus. FIG. 3 is a schematic cross-sectional view along line A-A' in FIG. 1.

As shown in FIG. 1 and FIG. 2, the foldable apparatus includes a spindle assembly 10 and two rotating components 20. The two rotating components 20 are located at two sides of the spindle assembly 10 in the unfolding state. The two rotating components 20 are stacked in the folding state.

As shown in FIG. 1, at least one of the two rotating components 20 is a first rotating component 20A. The first rotating component 20A includes a middle frame 21 and a rotating holder 22. The rotating holder 22 is rotatably connected to the spindle assembly 10. The middle frame 21 is located at a side of the rotating holder 22 away from the spindle assembly 10. The middle frame 21 and the rotating holder 22 are configured to slide in parallel. Referring to FIG. 2, optionally, the middle frame 21 includes multiple first rods 51 arranged at intervals. The rotating holder 22 includes multiple second rods 52 arranged at intervals. The second rod 52 is inserted into the interval between two adjacent first rods 51. The first rod 51 is inserted into the interval between two adjacent second rods 52. Multiple first rods 51 and multiple second rods 52 are located approximately on a same horizontal plane. When the middle frame 21 and the rotating holder 22 slide in parallel, the first rods 51 and the second rods 52 move relative to each other. Structures of the middle frame 21 and the rotating holder 22 shown in FIG. 1 and FIG. 2 are merely schematic representations, and are not intended to limit the present disclosure.

FIG. 3 shows different structures with different patterns for clarity. It can be learned from FIG. 3 that the first rotating component 20A further includes a transmission structure 23. FIG. 3 merely shows an optional embodiment of the transmission structure 23. FIG. 3 shows a rotating connector 15. The rotating holder 22 is rotatably connected to the spindle assembly 10 through the rotating connector 15. The transmission structure 23 has one end connected to the spindle assembly 10 and another end connected to the middle frame 21. At least a part of the transmission structure 23 is located in inner space of the rotating holder 22. The middle frame 21 is configured to adhere to a flexible display screen. The flexible display screen is flexible and can be folded along with the foldable apparatus. The flexible display screen includes a flexible substrate and a light-emitting device. The light-emitting device may be an organic light-emitting device or an inorganic light-emitting device. The foldable apparatus has a supporting surface for supporting the flexible display screen. A surface of the foldable apparatus in contact with the flexible display screen is the supporting surface.

The two rotating components 20 rotate relative to the spindle assembly 10 to enable the foldable apparatus to switch between the unfolding state and the folding state. FIG. 1 shows that one of the two rotating components 20 is the first rotating component 20A. When the first rotating component 20A rotates relative to the spindle assembly 10, the transmission structure 23 moves relative to the rotating holder 22 and drives the middle frame 21 to slide in parallel relative to the rotating holder 22. In other words, the sliding of the middle frame 21 in parallel relative to the rotating holder 22 is operably associated with the rotation of the first rotating component 20A relative to the spindle assembly 10. It can be understood that when the middle frame 21 slides in parallel relative to the rotating holder 22, an overall length of the first rotating component 20A changes in a direction of the sliding.

An overall length of a foldable apparatus in the related art in the folding state is longer than that in the unfolding state. If the flexible display screen is located at an outer side of the foldable apparatus in the folding state, the flexible display screen is stretched. If the flexible display screen is located at an inner side of the foldable apparatus in the folding state, the flexible display screen is squeezed. In the foldable apparatus provided in some embodiments of the present disclosure, the first rotating component 20A includes the middle frame 21, the rotating holder 22, and the transmission structure 23. The transmission structure 23 has the end connected to the spindle assembly 10 and another end connected to the middle frame 21. When the first rotating component 20A rotates relative to the spindle assembly 10, the transmission structure 23 moves relative to the rotating holder 22 and drives the middle frame 21 to slide in parallel relative to the rotating holder 22. In this way, the overall length of the first rotating component 20A changes. In other words, the first rotating component 20A has different lengths in the unfolding state and the folding state. The length of the first rotating component 20A is adjustable. In addition, the middle frame 21 is configured to adhere to the flexible display screen. When the middle frame 21 slides in parallel relative to the rotating holder 22, the middle frame 21 can drive the flexible display screen to move together. A length variation of the first rotating component 20A is designed based on a length of the flexible display screen so that a length of a supporting surface of the foldable apparatus can be matched with the length of the flexible display screen in both the unfolding state and the folding state. In some embodiments of the present disclosure, the length of the first rotating component 20A changes in coordination with the unfolding state and the folding state. This can ensure that the flexible display screen is constant in length, so that the flexible display screen is not stretched or squeezed, avoiding damage to the flexible display screen.

Figure 4:
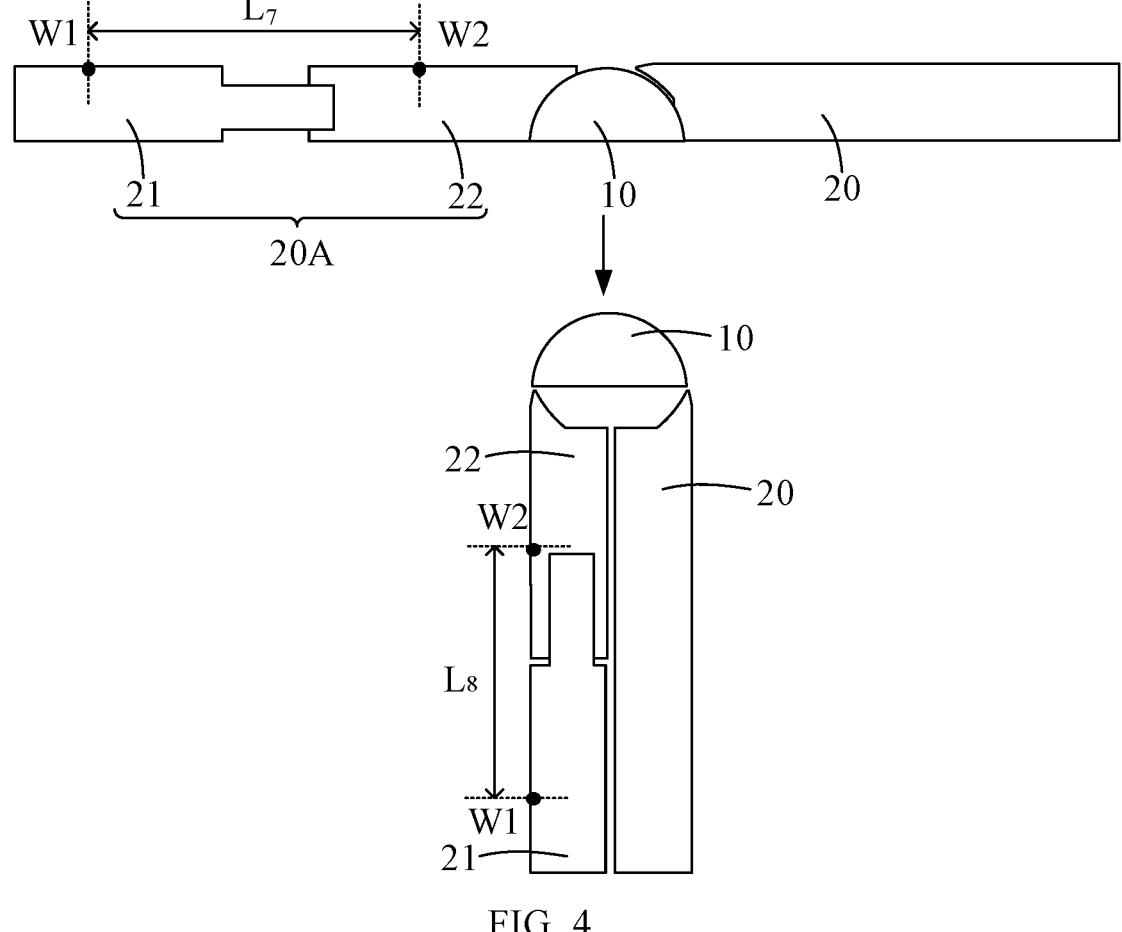
FIG. 4 is a simplified schematic diagram of a foldable apparatus according to an embodiment of the present disclosure.

That the flexible display screen is constant in length in the embodiments of the present disclosure means that when the foldable apparatus and the flexible display screen are assembled into an electronic device, the length of the flexible display screen in the unfolding state is approximately equal to that in the folding state. An application of the foldable apparatus provided in the embodiments of the present disclosure is described by using an outward foldable electronic device as an example. FIG. 4 is a simplified schematic diagram of a foldable apparatus according to an embodiment of the present disclosure. In FIG. 4, each structure is simplified, and the transmission structure 23 in the first rotating component 20A is not shown. As shown in FIG. 4, the middle frame 21 has a first fixed point W1. The rotating holder 22 has a second fixed point W2. In the unfolding state, a distance between the first fixed point W1 and the second fixed point W2 is defined as $L_7$. In the folding state, a distance between the first fixed point W1 and the second fixed point W2 is defined as $L_8$, where $L_7 > L_8$. In an outward foldable product, the flexible display screen is located at the outer side of the foldable apparatus in the folding state. During switching from the unfolding state to the folding state, the transmission structure 23 moves relative to the rotating holder 22 and drives the middle frame 21 to slide in parallel relative to the rotating holder 22. The distance between the first fixed point W1 and the second fixed point W2 becomes smaller so that the overall length of the first rotating component 20A decreases. The length of the supporting surface of the foldable apparatus for supporting the flexible display screen in the folding state is approximately the same as that in the unfolding state. This can ensure that the flexible display screen is constant in length. The flexible display screen is not stretched in the folding state. Correspondingly, it can be understood that during switching from the folding state to the unfolding state, the middle frame 21 slides in parallel relative to the rotating holder 22 so that the overall length of the first rotating component 20A increases.

In an inward foldable product, the flexible display screen is located at the inner side of the foldable apparatus in the folding state. During switching from the unfolding state to the folding state, the transmission structure 23 moves relative to the rotating holder 22 and drives the middle frame 21 to slide in parallel relative to the rotating holder 22 so that the overall length of the first rotating component 20A increases. The length of the supporting surface of the foldable apparatus for supporting the flexible display screen in the folding state is approximately the same as that in the unfolding state. This can ensure that the flexible display screen is constant in length. The flexible display screen is not stretched in the folding state.

In some embodiments of the present disclosure, when the foldable apparatus switches between the unfolding state and the folding state, the transmission structure 23 is configured to drive the middle frame 21 so that the middle frame 21 slides in parallel relative to the rotating holder 22. In this way, the overall length of the first rotating component 20A changes. A structure and driving manner of the transmission structure 23 are described below through some embodiments.

In some embodiments of the present disclosure, as shown in FIG. 3, the transmission structure 23 includes a pipe 231 and a filler 232 located in the pipe 231. The filler 232 is in a flowing state. The filler 232 may be a liquid or gas. The pipe 231 includes a first end facing the spindle assembly 10 and a second end facing the middle frame 21. The spindle assembly 10 is at least partially embedded in the first end of the pipe 231 and operably associated with the filler 232 and is configured to slide relative to the pipe 231. The middle frame 21 is at least partially embedded in the second end of the pipe 231 and operably associated with the filler 232 and is configured to slide relative to the pipe 231. In some embodiments of the present disclosure, the spindle assembly 10 is at least partially embedded in the first end of the pipe 231 and the middle frame 21 is at least partially embedded in the second end of the pipe 231 so that enclosed space is formed in the pipe 231. When a temperature is approximately unchanged, pressure and a volume of the enclosed space in the pipe 231 are unchanged, and the filler 232 in the pipe 231, the spindle assembly 10, and the middle frame 21 can be linked. When the first rotating component 20A rotates relative to the spindle assembly 10, the part of the spindle assembly 10 embedded in the first end of the pipe 231 slides relative to the pipe 231 so that the filler 232 moves in the pipe 231, and further drives the middle frame 21 to slide in parallel relative to the rotating holder 22. In this way, the overall length of the first rotating component 20A changes. In some embodiments of the present disclosure, the transmission structure 23 has a simple structure and low process costs. In addition, the filler 232, the spindle assembly 10, and the middle frame 21 are linked based on a principle that the pressure of the enclosed space in the pipe 231 is constant. The driving manner of the transmission structure 23 is simple, and an adjustment to the length of the first rotating component 20A is highly reliable and accurate.

Figure 5:
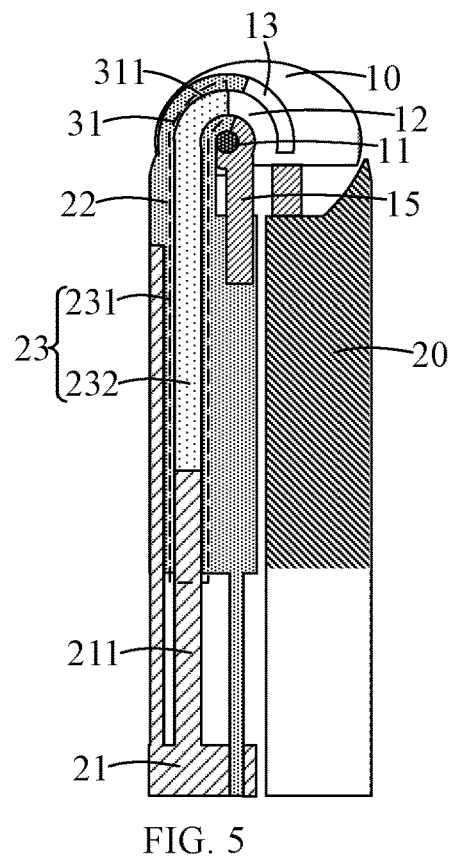
FIG. 5 is a schematic diagram of a foldable apparatus according to another embodiment of the present disclosure.

FIG. 5 is a schematic diagram of a foldable apparatus according to another embodiment of the present disclosure. FIG. 5 shows the folding state of the foldable apparatus according to the embodiment in FIG. 3. Referring to FIG. 3 and FIG. 5, the spindle assembly 10 includes a first rotating shaft 11. The rotating holder 22 is rotatably connected to the first rotating shaft 11. The rotating holder 22 rotates around the first rotating shaft 11 so that the first rotating component 20A rotates relative to the spindle assembly 10. The first end of the pipe 231 includes a bending portion 31. The bending portion 31 is bent circumferentially around the first rotating shaft 11. The spindle assembly 10 further includes a first embedding member 12. The first embedding member 12 at least partially surrounds the first rotating shaft 11. The first embedding member 12 has one end fixedly connected to the first rotating shaft 11 and another end embedded in the pipe 231. The end of the first embedding member 12 is fixedly connected to the first rotating shaft 11 so that relative positions of the first embedding member 12 and the first rotating shaft 11 are unchanged when the foldable apparatus switches between the folding state and the unfolding state. When the first rotating component 20A rotates relative to the spindle assembly 10, the first embedding member 12 is at least partially embedded in the bending portion 31 and slides relative to the bending portion 31. Movement of the filler 232 is operably associated with the sliding of the first embedding member 12.

In some embodiments of the present disclosure, the pipe 231 includes the bending portion 31 bent circumferentially around the first rotating shaft 11, the first embedding member 12 surrounds the first rotating shaft 11, and the first embedding member 12 is configured to slide in the bending portion 31. During switching from the folding state to the unfolding state, the rotating holder 22 rotates around the first rotating shaft 11, the first embedding member 12 enters the bending portion 31 and slides in the bending portion 31, and the first embedding member 12 drives the filler 232 to move in the pipe 231. Because the pressure of the enclosed space in the pipe 231 is unchanged, the movement of the filler 232 drives the middle frame 21 to move away from the spindle assembly 10 relative to the rotating holder 22. In this way, the length of the first rotating component 20A increases. During switching from the unfolding state to the folding state, the rotating holder 22 rotates around the first rotating shaft 11, and the first embedding member 12 is pulled out of the bending portion 31 to the outside of the pipe 231. Because the pressure of the enclosed space in the pipe 231 is unchanged, the filler 232 moves along with the first embedding member 12. Correspondingly, the middle frame 21 moves along with the filler 232 close to the spindle assembly 10. In this way, the length of the first rotating component 20A decreases. In the foldable apparatus provided in some embodiments, in the unfolding state, a length of the part of the first embedding member 12 embedded in the bending portion 31 is defined as $L_1$. In the folding state, a length of the part of the first embedding member 12 embedded in the bending portion 31 is defined as $L_2$. $L_1>L_2$. The length of the first rotating component 20A in the folding state is smaller than the length of the first rotating component 20A in the unfolding state so that the foldable apparatus can be applied to the outward foldable electronic device. In the outward foldable electronic device, the middle frame 21 adheres to the flexible display screen. When the middle frame 21 slides in parallel relative to the rotating holder 22, the flexible display screen is driven to move together. The length of the first rotating component 20A in the folding state is smaller than the length of the first rotating component 20A in the unfolding state so that the length of the supporting surface of the foldable apparatus in the outward foldable electronic device in the folding state is approximately the same as that in the unfolding state. This can ensure that the flexible display screen is constant in length. The flexible display screen is not stretched in the folding state.

In some embodiments of the present disclosure, referring to FIG. 3 and FIG. 5, the spindle assembly 10 further includes a sliding rail 13. The sliding rail 13 is fixedly connected to the first embedding member 12. In other words, relative positions of the sliding rail 13 and the first embedding member 12 are unchanged. The bending portion 31 includes a first bending wall 311. The first bending wall 311 is a side wall of the bending portion 31 away from the first rotating shaft 11 in a radial direction of the first rotating shaft 11. When the first rotating component 20A rotates relative to the spindle assembly 10, the first bending wall 311 at least partially slides into the sliding rail 13 and slides relative to the sliding rail 13. During switching from the folding state to the unfolding state, as the rotating holder 22 rotates around the first rotating shaft 11, a length of the part of the first bending wall 311 sliding into the sliding rail 13 gradually increases. During switching from the unfolding state to the folding state, as the rotating holder 22 rotates around the first rotating shaft 11, the first bending wall 311 slides out of the sliding rail 13, that is, the length of the part of the first bending wall 311 sliding into the sliding rail 13 gradually decreases. The sliding rail 13 may also be considered as space for accommodating the first bending wall 311 in the spindle assembly 10. The sliding rail 13 makes an engagement position of the spindle assembly 10 and the transmission structure 23 more stable and overall mechanical stability of the foldable apparatus better during switching between the folding state and the unfolding state.

In some embodiments of the present disclosure, as shown in FIG. 3, the middle frame 21 includes a second embedding member 211. The second embedding member 211 has one end embedded in the second end of the pipe 231 and another end fixedly connected to a main body portion 212 of the middle frame 21. Movement of the second embedding member 211 drives the middle frame 21 to move. When the first rotating component 20A rotates relative to the spindle assembly 10, the second embedding member 211 slides relative to the pipe 231 and drives the main body portion 212 of the middle frame 21 to slide in parallel relative to the rotating holder 22. The sliding of the second embedding member 211 is operably associated with the movement of the filler 232. Referring to FIG. 3 and FIG. 5, in the unfolding state, a length of a part of the second embedding member 211 embedded in the pipe 231 is defined as $L_3$. In the folding state, a length of a part of the second embedding member 211 embedded in the pipe 231 is defined as $L_4$. $L_3<L_4$. During switching from the unfolding state to the folding state, the rotating holder 22 rotates around the first rotating shaft 11, and the first embedding member 12 slides out of the bending portion 31 of the pipe 231. The filler 232 in the pipe 231 moves in the pipe 231 along with the first embedding member 12. The second embedding member 211 moves close to the spindle assembly 10 along with the filler 231. The length of the part of the second embedding member 211 embedded in the pipe 231 gradually increases. The second embedding member 211 drives the middle frame 21 to slide in parallel relative to the rotating holder 22. In this way, the overall length of the first rotating component 20A decreases. Correspondingly, during switching from the folding state to the unfolding state, the length of the part of the second embedding member 211 embedded in the pipe 231 gradually decreases. The second embedding member 211 drives the middle frame 21 to slide in parallel relative to the rotating holder 22 away from the spindle assembly 10. In this way, the overall length of the first rotating component 20A increases. In some embodiments of the present disclosure, the second embedding member 211, the filler 232 in the pipe 231, and the first embedding member 12 are linked based on the principle that the pressure of the enclosed space in the pipe 231 is constant. The driving manner of the transmission structure 23 is simple, and an adjustment to the length of the first rotating component 20A is highly reliable and accurate.

In some embodiments of the present disclosure, a length of the first embedding member 12 disposed in the spindle assembly 10 is limited. Consequently, the length of the part of the first embedding member 12 embedded in the pipe 231 is limited, resulting in a limited displacement of the middle frame 21 sliding in parallel relative to the rotating holder 22 that can be implemented through the linkage of the second embedding member 211, the filler 232 in the pipe 231, and the first embedding member 12. To ensure that the length variation of the first rotating component 20A can match the length of the flexible display screen, the transmission structure 23 is further improved in the embodiments of the present disclosure.

In some embodiments of the present disclosure, a radial sectional area of the first end of the pipe 231 is greater than a radial sectional area of the second end of the pipe 231. A radial cross section of the pipe 231 may be circular, rectangular, or of another shape. The first end of the pipe 231 includes the bending portion 31. A radial sectional area of the bending portion 31 is a sectional area of the bending portion in the radial direction of the first rotating shaft 11. The first end of the pipe 231 may alternatively include a straight pipe. A radial sectional area of the straight pipe is a sectional area of the pipe in a direction perpendicular to an extension direction of the pipe. In some embodiments of the present disclosure, a volume per unit length of the first end of the pipe 231 is greater than a volume per unit length of the second end of the pipe 231. For example, during switching from the folding state to the unfolding state, the rotating holder 22 rotates around the first rotating shaft 11, and the first embedding member 12 slides into the bending portion 31 and drives the filler 232 to move in the pipe 231. Because the radial sectional area of the first end of the pipe 231 is greater than the radial sectional area of the second end of the pipe 231, when a displacement of the first embedding member 12 moving in the bending portion 31 is Δ1, the displacement of the middle frame 21 translating relative to the rotating holder 22 is Δ2, and Δ2 is greater than Δ1. In some embodiments of the present disclosure, the length variation of the first rotating component 20A can be increased to match the length of the flexible display screen. The length of the first rotating component 20A changes in coordination with the unfolding state and the folding state. This can ensure that the flexible display screen is constant in length, so that the flexible display screen is not stretched or squeezed, avoiding damage to the flexible display screen.

Figure 6:
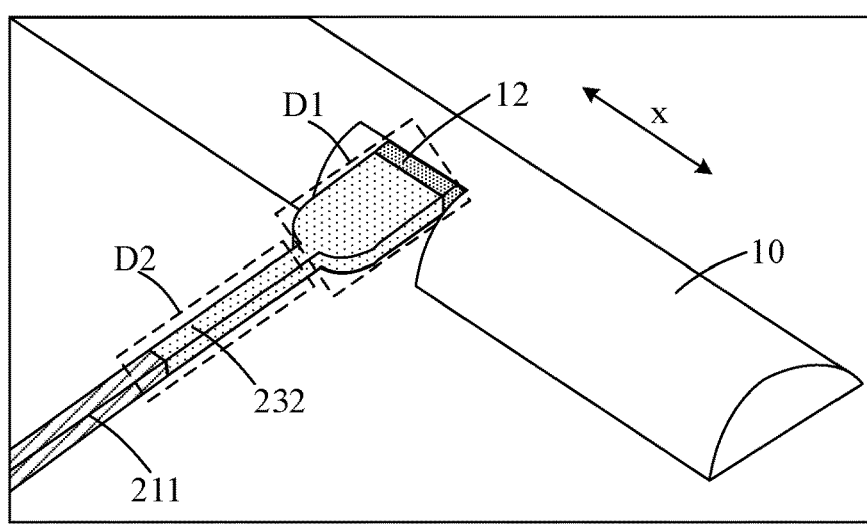
FIG. 6 is a schematic diagram of a foldable apparatus according to another embodiment of the present disclosure.

FIG. 6 is a schematic diagram of a foldable apparatus according to another embodiment of the present disclosure. FIG. 6 shows the unfolding state of the foldable apparatus in a simplified manner. The filler 232 in the pipe 231 is pushed out of the bending portion 31 of the pipe by the first embedding member 12. FIG. 6 shows the first embedding member 12, the second embedding member 211, and the filler 232, but does not show the pipe 231. The filler 232 is located in the pipe 231. A general shape of the pipe 231 may be determined by a shape of the filler 232. It can be learned from FIG. 6 that in a direction parallel to an extension direction x of the spindle assembly 10, an inner width of the first end D1 of the pipe 231 is greater than an inner width of the second end D2 of the pipe 231. Because a length of the spindle assembly 10 in the extension direction x is large and a thickness of the foldable apparatus in the unfolding state is far smaller than the length of the spindle assembly 10 in the direction x, an adjustable range of a length of the first end D1 of the pipe 231 in the direction x is large. An inner length of the first end D1 in the direction x is set to be greater than an inner length of the second end D2 in the direction x. This helps increase the radial sectional area of the first end D1 of the pipe 231, to increase the length variation of the first rotating component 20A so that the length of the flexible display screen can be matched in the unfolding state and the folding state.

Figure 7:
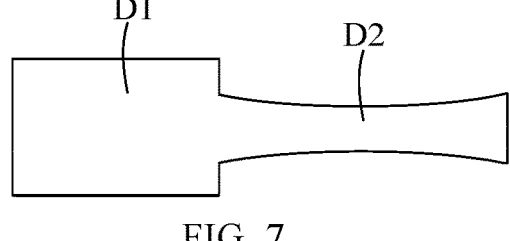
FIG. 7 is a schematic diagram of a foldable apparatus according to another embodiment of the present disclosure.

FIG. 7 is a schematic diagram of a foldable apparatus according to another embodiment of the present disclosure. FIG. 7 shows only the shape of the pipe 231 in a top view. As shown in FIG. 7, in a direction away from the first end D1 of the pipe 231, the radial sectional area of the second end D2 of the pipe 231 first gradually decreases and then gradually increases. In some embodiments of the present disclosure, because the radial sectional area of the second end D2 is not constant, the second embedding member 211 having deformability may be disposed in the middle frame 21 to match with the second end D2. This enables the second embedding member 211 to slide in the second end D2 and ensures that the space in the pipe 231 is enclosed. When the first rotating component 20A rotates relative to the spindle assembly 10, the first embedding member 12, the filler 232, and the second embedding member 211 are linked. The radial sectional area of the second end D2 of the pipe is set to change under a rule so that a relationship between a translation rate of the middle frame 21 relative to the rotating holder 22 and a rotation angle of the first rotating component 20A relative to the spindle assembly 10 is a nonlinear relationship. When the foldable apparatus switches between the unfolding state and the folding state, the flexible display screen can be kept in a tightened state, and arching of the flexible display screen is reduced.

In some embodiments of the present disclosure, the radial sectional area of the second end of the pipe 231 is $d_2 \times h_2$. $d_2$ is the inner width of the second end of the pipe 231 in the direction parallel to the extension direction x of the spindle assembly 10. $h_2$ is an inner thickness of the second end of the pipe 231 in a direction perpendicular to a plane of the first rotating component 20A.

$$d_2 \times h_2 \times \Delta = d_1 \times (\pi \times r_1{}^2 - \pi \times r_2{}^2)/4$$

Δ is a length compensation amount of the first rotating component 20A, which is also a maximum length variation of the first rotating component 20A. $d_1$ is an inner width of the bending portion 31 in a direction parallel to an axial direction of the first rotating shaft 11.

Figure 8:
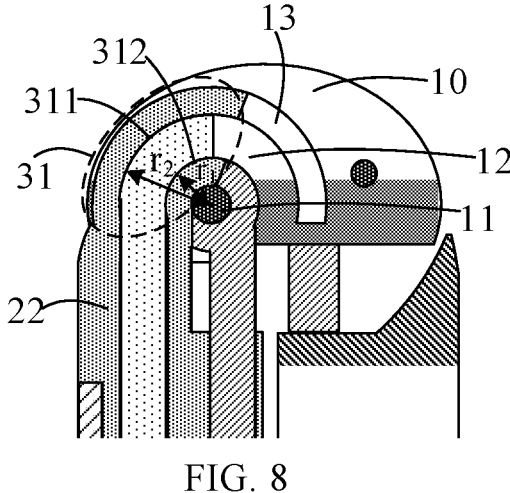
FIG. 8 is a schematic diagram of a foldable apparatus according to another embodiment of the present disclosure.

FIG. 8 is a schematic diagram of a foldable apparatus according to another embodiment of the present disclosure. FIG. 8 is a schematic cross-sectional view of a local position in the folding state. As shown in FIG. 8, the bending portion 31 includes a first bending wall 311 and a second bending wall 312. In a radial direction of the first rotating shaft 11, the first bending wall 311 is a side wall of the bending portion 31 away from the first rotating shaft 11, and the second bending wall 312 is a side wall of the bending portion 31 close to the first rotating shaft 11. $r_1$ is a distance between the first bending wall 311 and an axial center of the first rotating shaft 11. $r_2$ is a distance between the second bending wall 312 and the axial center of the first rotating shaft 11.

The foregoing formula is established based on a fact that a volume variation of the filler 232 in the first end of the pipe 231 is equal to a volume variation of the filler 232 in the second end of the pipe 231. When the foldable apparatus switches from the unfolding state to the folding state, a maximum rotation angle of the first rotating component 20A relative to the spindle assembly 10 is 90°. In addition, a cross section of the first end of the pipe 231 is approximately regarded as a rectangle. The volume variation of the filler 232 in the first end of the pipe 231 is $d_1 \times (\pi \times r_1{}^2 - \pi \times r_2{}^2)/4$.

Specific parameters of the first end D1 and the second end D2 of the pipe 231 can be designed through the foregoing formula to meet a requirement for the length compensation amount of the first rotating component 20A.

In some embodiments of the present disclosure, hollow space in the rotating holder 22 forms the pipe 231. The rotating holder 22 and the pipe 231 may be integrally formed. The pipe 231 of the transmission structure 23 is formed through the rotating holder 22 so that the first rotating component 20A has a simpler structure. When a pipe is additionally disposed, a process such as a fixed connection between the pipe and the rotating holder 22 also needs to be considered. However, the design in the embodiments of the present disclosure can simplify a manufacturing process of the first rotating component 20A.

Figure 9:
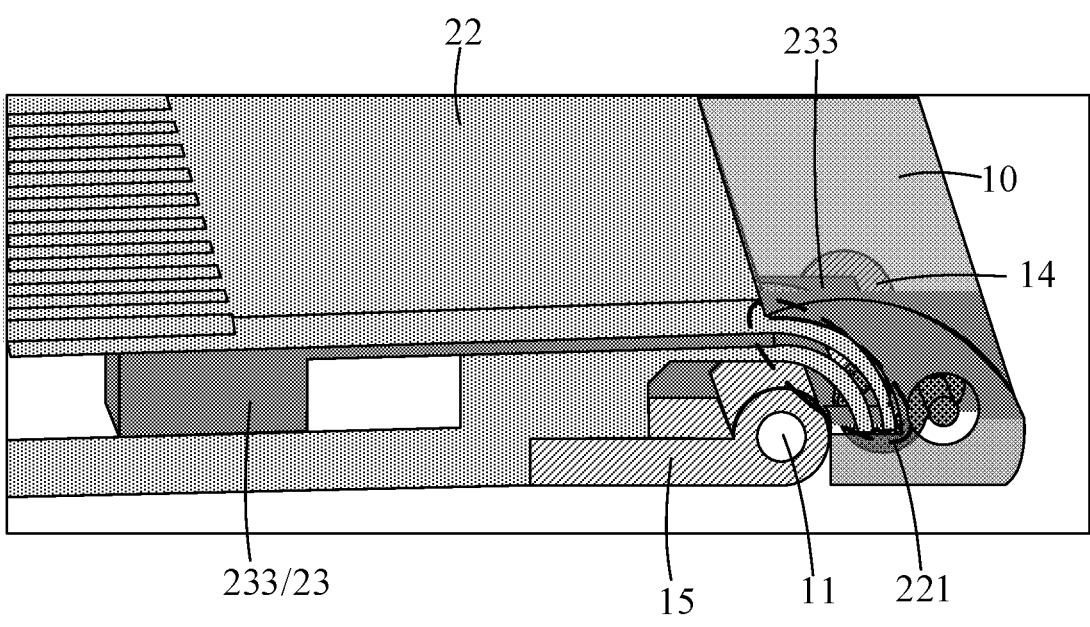
FIG. 9 is a schematic diagram of a foldable apparatus according to another embodiment of the present disclosure.
Figure 10:
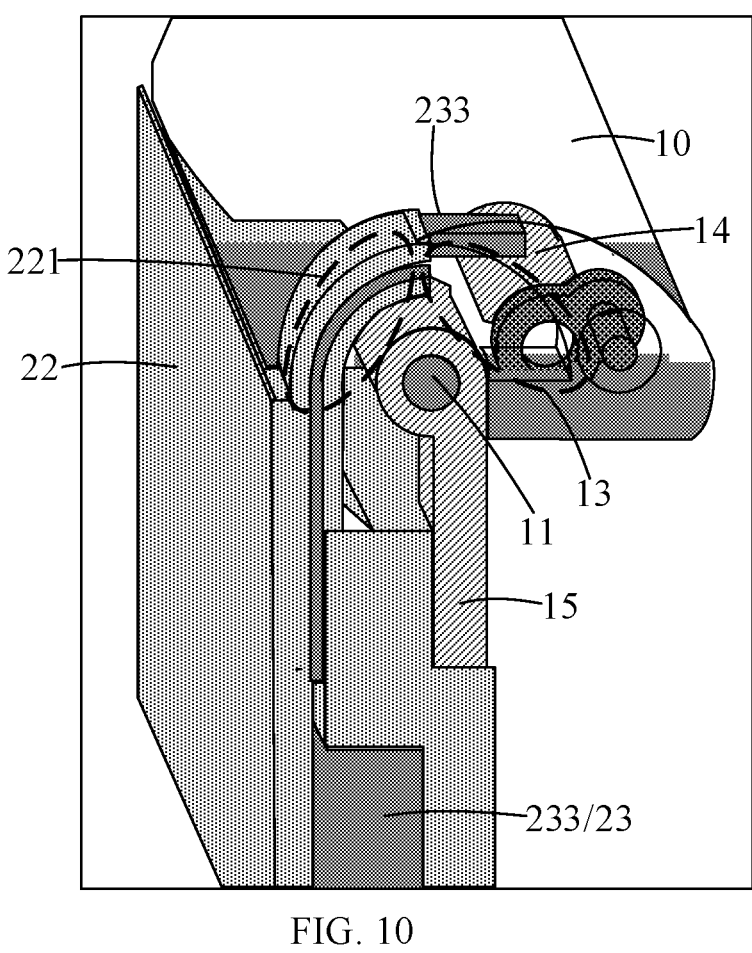
FIG. 10 is a schematic diagram of a foldable apparatus according to another embodiment of the present disclosure.

FIG. 9 is a schematic diagram of a foldable apparatus according to another embodiment of the present disclosure. FIG. 10 is a schematic diagram of a foldable apparatus according to another embodiment of the present disclosure. FIG. 9 is a schematic partial view of the foldable apparatus in the unfolding state. FIG. 10 is a schematic partial view of the foldable apparatus in the folding state. Referring to FIG. 9 and FIG. 10, the transmission structure 23 includes a transmission solid member 233. A first end of the transmission solid member 233 is fixedly connected to a first fixing portion 14 of the spindle assembly 10. A second end of the transmission solid member 233 is connected to the middle frame 21 (not shown in FIG. 9 and FIG. 10). At least the first end of the transmission solid member 233 is flexible. Optionally, the transmission solid member 233 is made of a flexible metal material. The spindle assembly 10 includes a first rotating shaft 11. The rotating holder 22 is rotatably connected to the first rotating shaft 11. In an embodiment, the rotating holder 22 is rotatably connected to the first rotating shaft 11 through a rotating connector 15. In addition, the first fixing portion 14 is fixedly connected to the first rotating shaft 11. The rotating holder 22 rotates around the first rotating shaft 11 so that the first rotating component 20A rotates relative to the spindle assembly 10. Because the transmission solid member 233 is fixedly connected to the first rotating shaft 11 through the first fixing portion 14, when the rotating holder 22 rotates around the first rotating shaft 11, the transmission solid member 233 moves relative to the rotating holder 22. In addition, the transmission solid member 233 is connected to the middle frame 21. The transmission solid member 233 drives the middle frame 21 to slide in parallel relative to the rotating holder 22. In this way, the overall length of the first rotating component 20A changes. In some embodiments of the present disclosure, the spindle assembly 10, the transmission solid member 233, and the middle frame 21 are linked. The driving manner of the transmission structure 23 is simple. The transmission structure 23 has a simple structure and low process costs.

Referring to FIG. 9 and FIG. 10, when the foldable apparatus switches from the unfolding state to the folding state, the rotating holder 22 rotates around the first rotating shaft 11, the transmission solid member 233 moves relative to the rotating holder 22, the transmission solid member 233 drives the middle frame 21 to move, and the middle frame 21 slides relative to the rotating holder 22 close to the spindle assembly 10. In this way, the length of the first rotating component 20A decreases. In other words, the length of the first rotating component 20A in the unfolding state is greater than the length of the first rotating component 20A in the folding state. The foldable apparatus provided in this embodiment can be applied to the outward foldable electronic device. The length of the supporting surface of the foldable apparatus in the outward foldable electronic device in the folding state is approximately the same as that in the unfolding state. This can ensure that the flexible display screen is constant in length. The flexible display screen is not stretched in the folding state.

In some embodiments of the present disclosure, as shown in FIG. 10, the rotating holder 22 includes a bending end portion 221. The bending end portion 221 is bent circumferentially around the first rotating shaft 11. The bending end portion 221 includes accommodating space. The first end of the transmission solid member 233 is located in the accommodating space. When the first rotating component 20A rotates relative to the spindle assembly 10, the bending end portion 221 rotates around the first rotating shaft 11, and the first end of the transmission solid member 233 moves relative to the bending end portion 221 in the accommodating space. The accommodating space of the bending end portion 221 is used to limit a movement track of the transmission solid member 233. When the foldable apparatus switches from the unfolding state to the folding state, the rotating holder 22 rotates around the first rotating shaft 11. The bending end portion 221 rotates around the first rotating shaft 11 along with the rotating holder 22 so that the transmission solid member 233 moves relative to the rotating holder 22. The first end of the transmission solid member 233 extends into the accommodating space of the bending end portion 221. The transmission solid member 233 drives the middle frame 21 to move in parallel relative to the rotating holder 22 close to the spindle assembly 10. In this way, the length of the first rotating component 20A decreases. When the foldable apparatus switches from the folding state to the unfolding state, the rotating holder 22 rotates around the first rotating shaft 11. The bending end portion 221 rotates around the first rotating shaft 11 along with the rotating holder 22 so that the transmission solid member 233 moves relative to the rotating holder 22. The first end of the transmission solid member 233 is pulled out of the accommodating space of the bending end portion 221. The transmission solid member 233 drives the middle frame 21 to move in parallel relative to the rotating holder 22 away from the spindle assembly 10, so that the length of the first rotating component 20A increases. In some embodiments of the present disclosure, the accommodating space of the bending end portion 221 is configured to limit the movement track of the transmission solid member 233. A distance between the bending end portion 221 and the axial center of the first rotating shaft 11 in the radial direction of the first rotating shaft 11 affects the length variation of the first rotating component 20A during switching between the folding state and the unfolding state. Increasing the distance between the bending end portion 221 and the axial center of the first rotating shaft 11 in the radial direction of the first rotating shaft 11 can increase the length variation of the first rotating component 20A.

In some embodiments of the present disclosure, as shown in FIG. 10, the spindle assembly 10 further includes a sliding rail 13. The sliding rail 13 is fixedly connected to the first rotating shaft 11. When the first rotating component 20A rotates relative to the spindle assembly 10, the bending end portion 221 slides into the sliding rail 13 and slides relative to the sliding rail 13. In the unfolding state, a length of a part of the bending end portion 221 sliding into the sliding rail 13 is defined as $L_5$. In the folding state, a length of a part of the bending end portion 221 sliding into the sliding rail 13 is defined as $L_6$, where $L_5 > L_6$. During switching from the folding state to the unfolding state, as the rotating holder 22 rotates around the first rotating shaft 11, the length of the part of the bending end portion 221 sliding into the sliding rail 13 gradually increases. During switching from the unfolding state to the folding state, as the rotating holder 22 rotates around the first rotating shaft 11, the bending end portion 221 slides out of the sliding rail 13, that is, the length of the part of the bending end portion 221 sliding into the sliding rail 13 gradually decreases. The sliding rail 13 may also be considered as space for accommodating the bending end portion 221 in the spindle assembly 10. Through the sliding rail 13, during switching between the folding state and the unfolding state, the bending end portion 221 can limit the movement track of the transmission solid member 233 and make an engagement position of the rotating holder 22 and the spindle assembly 10 more stable and overall mechanical stability of the foldable apparatus better.

In some embodiments of the present disclosure, the transmission structure 23 further includes a displacement adjustment structure. The second end of the transmission solid member 233 is connected to the middle frame 21 through the displacement adjustment structure. The displacement adjustment structure is configured to increase a relative displacement between the transmission solid member 233 and the middle frame 21 when the transmission structure 23 drives the middle frame 21 to move. The displacement adjustment structure can increase the length variation of the first rotating component 20A to match the length of the flexible display screen. The length of the first rotating component 20A changes in coordination with the unfolding state and the folding state. This can ensure that the flexible display screen is constant in length, so that the flexible display screen is not stretched or squeezed, avoiding damage to the flexible display screen.

Figure 11:
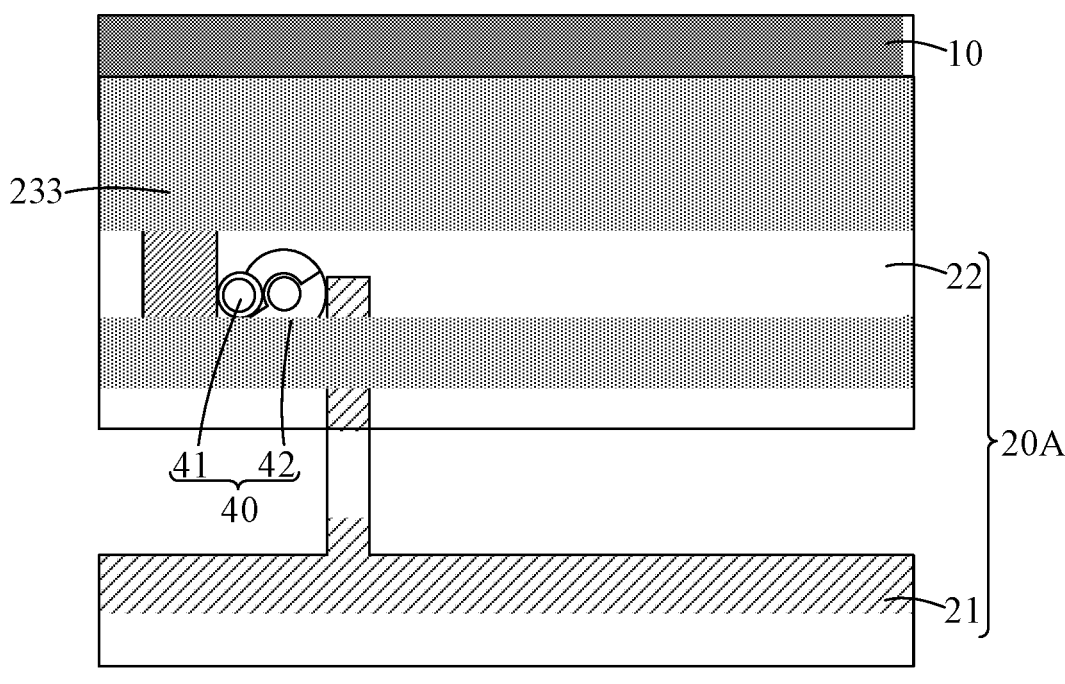
FIG. 11 is a schematic diagram of a foldable apparatus according to another embodiment of the present disclosure.
Figure 12:
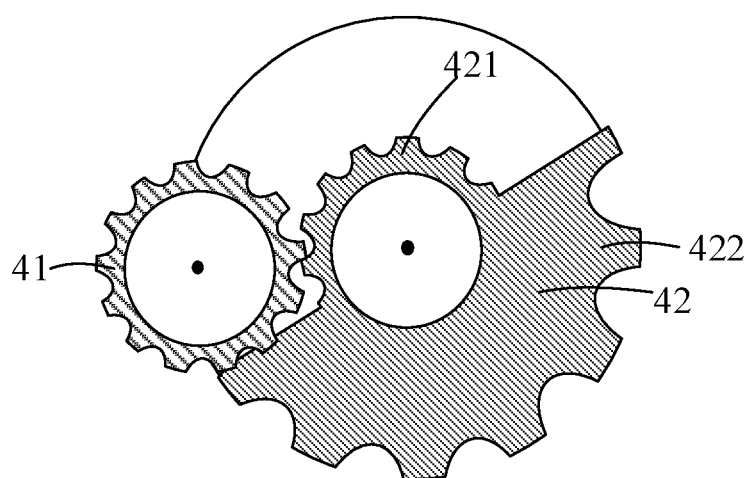
FIG. 12 is an enlarged schematic diagram of a displacement adjustment structure in FIG. 11 according to an embodiment of the present disclosure.

FIG. 11 is a schematic diagram of a foldable apparatus according to another embodiment of the present disclosure. FIG. 12 is an enlarged schematic diagram of a displacement adjustment structure in FIG. 11. FIG. 11 shows only the spindle assembly 10 and the first rotating component 20A in a simplified manner. As shown in FIG. 11 and FIG. 12, the displacement adjustment structure 40 includes a first gear 41 and a second gear 42 that are meshed with each other. The first gear 41 is meshed with a rack (not shown in FIG. 11) disposed on the second end of the transmission solid member 233. The second gear 42 is meshed with a rack (not shown in FIG. 11) disposed on the middle frame 21. The second gear 42 includes multiple first teeth 421 arranged in sequence and multiple second teeth 422 arranged in sequence. The first teeth 421 and the second teeth 422 have a same axial center. The first gear 41 is meshed with the first teeth 421. The rack disposed on the middle frame 21 is meshed with the second teeth 422. A distance between the first tooth 421 and an axial center of the second gear 42 is smaller than a distance between the second tooth 422 and the axial center of the second gear 42. A black solid point in the second gear 42 is an axial center thereof, which is not marked in FIG. 12. In some embodiments of the present disclosure, when the first rotating component 20A rotates relative to the spindle assembly 10, the transmission solid member 233 moves relative to the rotating holder 22. When the transmission solid member 233 moves, the first gear 41 and the second gear 42 that are meshed with each other are driven to rotate. Further, the middle frame 21 is driven to slide in parallel relative to the rotating holder 22. The first gear 41 and the second gear 42 are designed so that when the transmission solid member 233 drives the middle frame 21 to move, a displacement of the middle frame 21 relative to the rotating holder 22 is greater than a displacement of the transmission solid member 233 relative to the rotating holder 22. This can increase the length variation of the first rotating component 20A. In some embodiments of the present disclosure, the displacement adjustment structure 40 has a simple structure and low process costs.

In some embodiments of the present disclosure, as shown in FIG. 5, the rotating holder 22 is rotatably connected to the spindle assembly 10 through a rotating connector 15. The rotating connector 15 drives the rotating holder 22 to rotate around the first rotating shaft 11. In the radial direction of the first rotating shaft 11, the rotating connector 15 overlaps the transmission structure 23. In some embodiments of the present disclosure, the rotating connector 15 and the transmission structure 23 are concentrated and connected to the spindle assembly 10, which can save space of the spindle assembly 10 in the axial direction of the first rotating shaft 11. The axial direction of the first rotating shaft 11 is also the extension direction of the spindle assembly 10. For example, rotating connectors 15 may be disposed at multiple positions of the spindle assembly 10 in the extension direction of the spindle assembly 10, so that reliability of the connection between the rotating holder 22 and the spindle assembly 10 can be improved.

In some embodiments of the present disclosure, the rotating holder 22 is rotatably connected to the spindle assembly 10 through the rotating connector 15. The rotating connector 15 and the transmission structure 23 are arranged in the axial direction of the first rotating shaft 11. Referring to FIG. 5, the axial direction of the first rotating shaft 11 is perpendicular to a direction of paper surface. In some embodiments of the present disclosure, a position relationship between the rotating connector 15 and the transmission structure 23 is set so that the bending portion 31 of the transmission structure 23 does not overlap the rotating connector 15 in a direction perpendicular to a plane of the foldable apparatus in the unfolding state, reducing the thickness of the foldable apparatus in the unfolding state.

Figure 13:
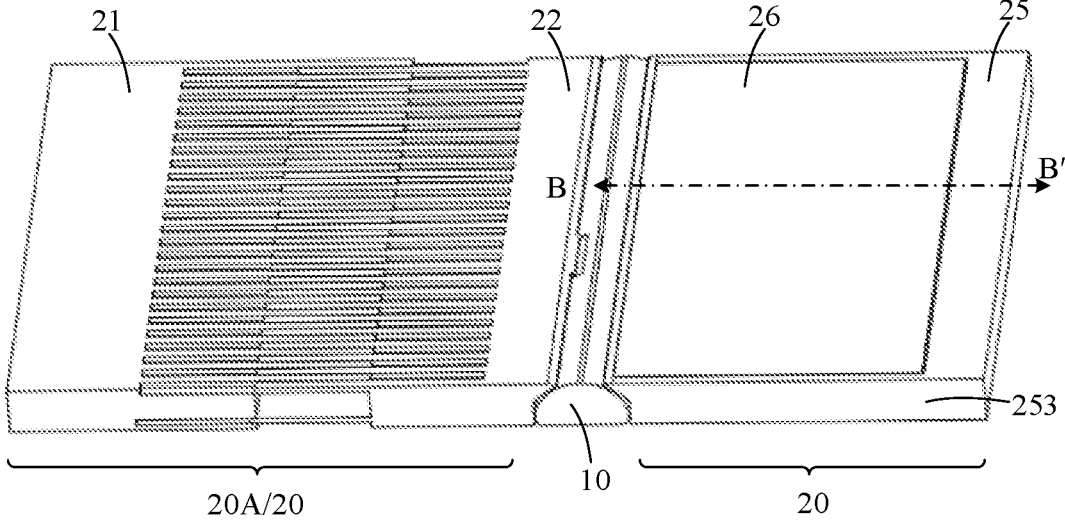
FIG. 13 is a schematic diagram of a foldable apparatus according to another embodiment of the present disclosure.
Figure 14:
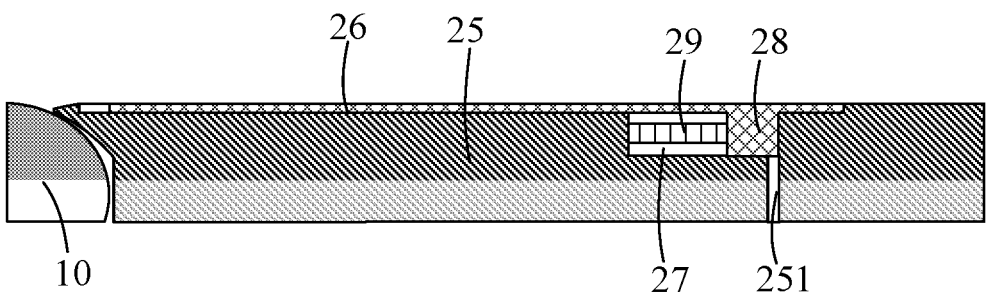
FIG. 14 is a cross-sectional view along line B-B' in FIG. 13 according to an embodiment of the present disclosure.

FIG. 13 is a schematic diagram of a foldable apparatus according to another embodiment of the present disclosure. FIG. 14 is a cross-sectional view along line B-B' in FIG. 13. As shown in FIG. 13, one of the two rotating components 20 is the first rotating component 20A. The other of the two rotating components 20 includes a main body 25 and an auxiliary sliding plate 26. The main body 25 is rotatably connected to the spindle assembly 10. The main body 25 and the auxiliary slide plate 26 are stacked. The auxiliary slide plate 26 is configured to slide in parallel relative to the main body 25. A side of the auxiliary sliding plate 26 away from the main body 25 is configured to adhere to the flexible display screen.

As shown in FIG. 14, a side of the main body 25 close to the auxiliary sliding plate 26 is provided with a first groove 27. A side of the auxiliary sliding plate 26 close to the main body 25 is provided with a protrusion 28. The protrusion 28 extends into the first groove 27. A spring 29 is disposed in the first groove 27. The spring 29 is located at a side of the protrusion 28 close to the spindle assembly 10. The spring 29 is in a contracted state. In application, the flexible display screen adheres to the auxiliary sliding plate 26. Because the spring 29 is in the contracted state, the spring 29 always pushes the protrusion 28 so that the auxiliary sliding plate 26 is pushed toward a side away from the spindle assembly 10. The auxiliary sliding plate 26 drives the flexible display screen to be tensioned. In application, a crease of the flexible display screen in the unfolding state can be reduced, and arching of the flexible display screen in a folding process can be reduced.

As shown in FIG. 14, the main body 25 further includes a second groove 251. The second groove 251 communicates with the first groove 27. The second groove 25 exposes a part of the protrusion 28. The second groove 251 is located at a side of the main body 25 away from the auxiliary sliding plate 26.

Figure 15:
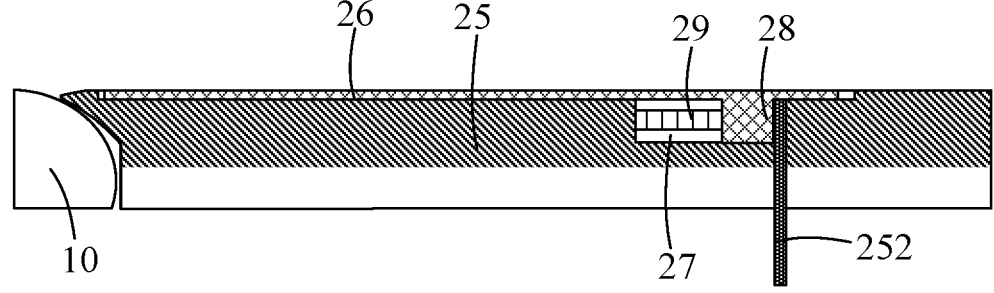
FIG. 15 is a schematic diagram of a foldable apparatus according to another embodiment of the present disclosure.

FIG. 15 is a schematic diagram of a foldable apparatus according to another embodiment of the present disclosure. Referring to FIG. 14 and FIG. 15, when the flexible display screen is assembled with the foldable apparatus, a male tab 252 is inserted into the second groove 251. The protrusion 28 of the auxiliary sliding plate 26 is disposed between the spring 29 and the male tab 252. The spring 29 is in the contracted state. The flexible display screen adheres to the auxiliary sliding plate 26. Then, the male tab 252 is removed. The spring 29 applies a force in a direction away from the spindle assembly 10 to the auxiliary sliding plate 26. In other words, the spring 29 pushes the auxiliary sliding plate 26 toward a side away from the spindle assembly 10, so that the flexible display screen is tensioned. In application, a crease of the flexible display screen in the unfolding state can be reduced, and arching of the flexible display screen in a folding process can be reduced.

In some embodiments of the present disclosure, the second groove 251 is located on an end surface of the main body 25. The end surface of the main body 25 intersects a plane of the auxiliary sliding plate 26, which are not shown in the drawings. For a position of the end surface 253 of the main body 25, FIG. 13 can be referred to.

Figure 16:
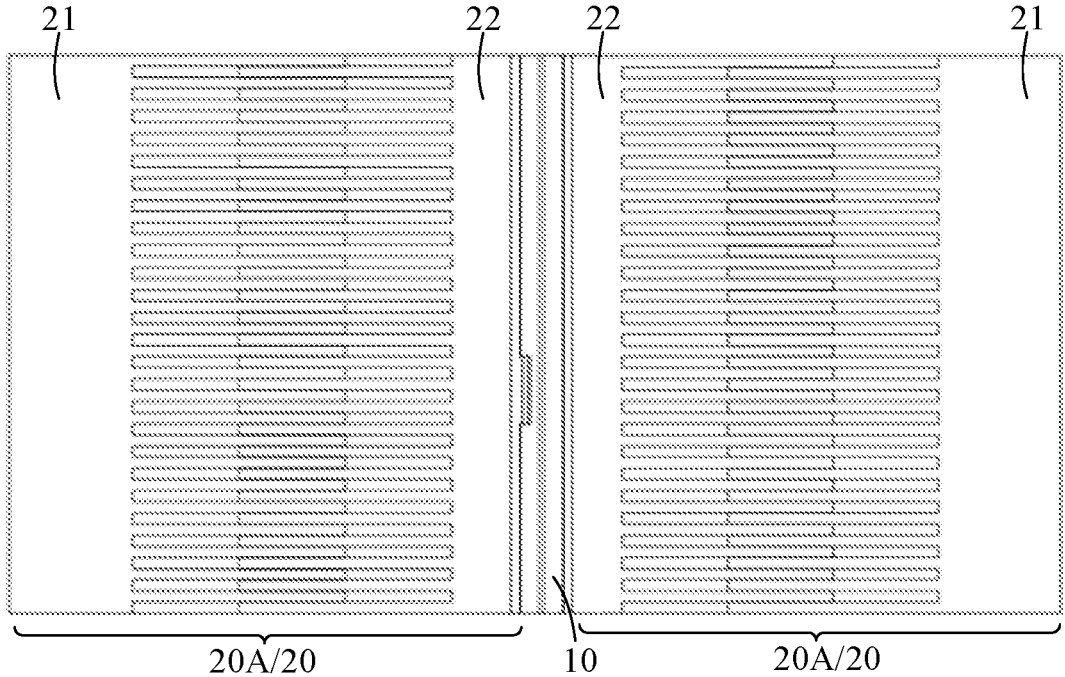
FIG. 16 is a schematic diagram of a foldable apparatus according to another embodiment of the present disclosure.

FIG. 16 is a schematic diagram of a foldable apparatus according to another embodiment of the present disclosure. As shown in FIG. 16, each of the two rotating components 20 is the first rotating component 20A. FIG. 16 shows only the middle frame 21 and the rotating holder 22 in the first rotating component 20A, but does not show the transmission structure 23. In some embodiments of the present disclosure, two first rotating components 20A are disposed. This can increase the length variation of the foldable apparatus during switching between the unfolding state and the folding state so that the length of the supporting surface of the foldable apparatus can be matched with the length of the flexible display screen in both the unfolding state and the folding state.

Figures 17, 18:
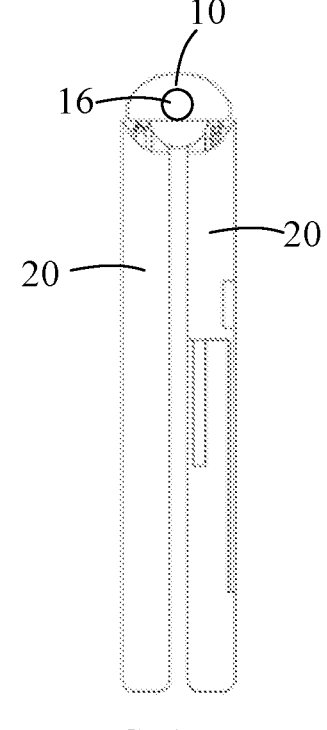
FIG. 17 is a schematic diagram of a foldable apparatus according to another embodiment of the present disclosure.
FIG. 18 is a schematic diagram of an electronic device according to an embodiment of the present disclosure.

FIG. 17 is a schematic diagram of a foldable apparatus according to another embodiment of the present disclosure. FIG. 17 shows the folding state of the foldable apparatus. The spindle assembly 10 of the foldable apparatus extends in a direction perpendicular to the paper surface. The spindle assembly 10 is provided with a third groove 16. The third groove 16 extends in the extension direction of the spindle assembly 10. The third groove 16 is configured to accommodate a stylus.

In some embodiments of the present disclosure, the spindle assembly 10 further includes a cam damping mechanism and a rotating shaft. The rotating component 20 is rotatably connected to the rotating shaft through a rotating connector. The cam damping mechanism is mounted on the rotating shaft and rotates with the rotating shaft. An example in which the rotating holder 22 of the first rotating component 20A is rotatably connected to the first rotating shaft through the rotating connector is used for description. The cam damping mechanism is mounted on the first rotating shaft and rotates with the first rotating shaft. The rotating connector can rotate around the first rotating shaft. The cam damping mechanism is provided with a recess and a protrusion. When the rotating connector rotates into the recess of the cam damping mechanism and continues to rotate, the cam damping mechanism provides resistance. When the rotating connector rotates to the protrusion of the cam damping mechanism and continues to rotate, the damping mechanism provides a certain sliding force.

Based on a same inventive concept, the embodiments of the present disclosure further provide an electronic device. FIG. 18 is a schematic diagram of an electronic device according to an embodiment of the present disclosure. As shown in FIG. 18, the electronic device includes a flexible display screen 01 and a foldable apparatus 02 provided in any embodiment of the present disclosure. The foldable apparatus 02 supports the flexible display screen 01. The flexible display screen 01 adheres to at least the middle frame 21 in the first rotating component 20A. The middle frame 21 is not marked in FIG. 18. A light-emitting device in the flexible display screen 01 may be an organic light-emitting diode or an inorganic light-emitting diode. A structure of the foldable apparatus 02 has been described in the foregoing embodiments, which are not elaborated here.

In some embodiments of the present disclosure, the foldable apparatus 02 includes the two first rotating components 20A shown in FIG. 16. The flexible display screen 01 adheres to the spindle assembly 10 in addition to the middle frame 21 in the first rotating component 20A. This can reduce a risk of movement and arching of the flexible display screen 01 when the electronic device is folded.

In some embodiments of the present disclosure, the electronic device is an outward foldable product. When the foldable apparatus 02 is in the folding state, the flexible display screen 01 is located at the outer side of the foldable apparatus 02.

The above are merely preferred embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A foldable apparatus configured to support a flexible display screen, the foldable apparatus comprising:

a spindle assembly; and two rotating components;

wherein the foldable apparatus comprises an unfolding state and a folding state, the two rotating components are located at two sides of the spindle assembly in the unfolding state, and the two rotating components are stacked in the folding state;

wherein at least one of the two rotating components is a first rotating component comprising a middle frame, a rotating holder, and a transmission structure; and the rotating holder is rotatably connected to the spindle assembly, the middle frame is located at a side of the rotating holder away from the spindle assembly, the middle frame and the rotating holder are configured to slide in parallel, the transmission structure comprises one end connected to the spindle assembly and another end connected to the middle frame, and the middle frame is configured to adhere to the flexible display screen;

wherein, when the first rotating component rotates relative to the spindle assembly, the transmission structure moves relative to the rotating holder and drives the middle frame to slide in parallel relative to the rotating holder; and wherein the transmission structure comprises a pipe and a filler located in the pipe; wherein the filler is in a flowing state; wherein the pipe comprises a first end facing the spindle assembly, and a second end facing the middle frame; wherein the middle frame is at least partially embedded in the second end of the pipe and operably associated with the filler and is configured to slide relative to the pipe; and wherein the spindle assembly is at least partially embedded in the first end of the pipe and operably associated with the filler and is configured to slide relative to the pipe; or wherein the transmission structure comprises a transmission solid member, the transmission solid member comprises a first end fixedly connected to a first fixing portion of the spindle assembly and a second end connected to the middle frame, and at least the first end of the transmission solid member is flexible; and wherein the spindle assembly comprises a first rotating shaft, the rotating holder is rotatably connected to the first rotating shaft, and the first fixing portion is fixedly connected to the first rotating shaft.

2. The foldable apparatus according to claim 1, wherein the spindle assembly comprises a first rotating shaft, and the rotating holder is rotatably connected to the first rotating shaft;

wherein the first end of the pipe comprises a bending portion that is bent circumferentially around the first rotating shaft;

wherein the spindle assembly further comprises a first embedding member that at least partially surrounds the first rotating shaft; and the first embedding member has one end fixedly connected to the first rotating shaft and another end embedded in the pipe; and wherein, when the first rotating component rotates relative to the spindle assembly, the first embedding member is at least partially embedded in the bending portion and slides relative to the bending portion, and movement of the filler is operably associated with the sliding of the first embedding member.

3. The foldable apparatus according to claim 2, wherein, in the unfolding state, a length of the part of the first embedding member embedded in the bending portion is defined as $L_1$; wherein in the folding state, a length of the part of the first embedding member embedded in the bending portion is defined as $L_2$; wherein $L_1 > L_2$.

4. The foldable apparatus according to claim 2, wherein the spindle assembly further comprises a sliding rail fixedly connected to the first embedding member;

wherein the bending portion comprises a first bending wall, and the first bending wall is a side wall of the bending portion away from the first rotating shaft in a radial direction of the first rotating shaft; and wherein, when the first rotating component rotates relative to the spindle assembly, the first bending wall at least partially slides into the sliding rail and slides relative to the sliding rail.

5. The foldable apparatus according to claim 1, wherein the middle frame comprises a second embedding member; and the second embedding member has one end embedded in the second end of the pipe and another end fixedly connected to a main body portion of the middle frame; and wherein, when the first rotating component rotates relative to the spindle assembly, the second embedding member slides relative to the pipe and drives the main body portion of the middle frame to slide in parallel relative to the rotating holder, and the sliding of the second embedding member is operably associated with movement of the filler.

6. The foldable apparatus according to claim 5, wherein in the unfolding state, a length of a part of the second embedding member embedded in the pipe is defined as $L_3$; wherein, in the folding state, a length of a part of the second embedding member embedded in the pipe is defined as $L_4$; wherein $L_3 < L_4$.

7. The foldable apparatus according to claim 1, wherein a radial sectional area of the first end of the pipe is greater than a radial sectional area of the second end of the pipe.

8. The foldable apparatus according to claim 7, wherein, in a direction parallel to an extension direction of the spindle assembly, an inner width of the first end of the pipe is greater than an inner width of the second end of the pipe.

9. The foldable apparatus according to claim 7, wherein, in a direction away from the first end of the pipe, the radial sectional area of the second end of the pipe first gradually decreases and then gradually increases.

10. The foldable apparatus according to claim 2, wherein a radial sectional area of the second end of the pipe is defined as $d_2 \times h_2$, $d_2$ denotes an inner width of the second end of the pipe in a direction parallel to an extension direction of the spindle assembly, and $h_2$ denotes an inner thickness of the second end of the pipe in a direction perpendicular to a plane of the first rotating component;

wherein $d_2 \times h_2 \times \Delta = d_1 \times (\pi \times r_1^2 - \pi \times r_2^2)/4$;

wherein $\Delta$ denotes a length compensation amount of the first rotating component;

wherein $d_1$ denotes an inner width of the bending portion in a direction parallel to an axial direction of the first rotating shaft; and wherein the bending portion comprises a first bending wall and a second bending wall; in a radial direction of the first rotating shaft, the first bending wall is a side wall of the bending portion away from the first rotating shaft, and the second bending wall is a side wall of the bending portion close to the first rotating shaft; $r_1$ is defined as a distance between the first bending wall and an axial center of the first rotating shaft; and $r_2$ is defined as a distance between the second bending wall and the axial center of the first rotating shaft.

11. The foldable apparatus according to claim 1, wherein a hollow space in the rotating holder forms the pipe.

12. The foldable apparatus according to claim 1, wherein the rotating holder comprises a bending end portion bent circumferentially around the first rotating shaft; and the bending end portion comprises an accommodating space, and the first end of the transmission solid member is located in the accommodating space; and when the first rotating component rotates relative to the spindle assembly, the bending end portion rotates around the first rotating shaft, and the first end of the transmission solid member moves relative to the bending end portion in the accommodating space.

13. The foldable apparatus according to claim 12, wherein the spindle assembly further comprises a sliding rail fixedly connected to the first rotating shaft; and wherein, when the first rotating component rotates relative to the spindle assembly, the bending end portion slides into the sliding rail and slides relative to the sliding rail.

14. The foldable apparatus according to claim 13, wherein, in the unfolding state, a length of a part of the bending end portion sliding into the sliding rail is defined as $L_5$; wherein, in the folding state, a length of a part of the bending end portion sliding into the sliding rail is defined as $L_6$; wherein $L_5 > L_6$.

15. The foldable apparatus according to claim 1, wherein the transmission structure further comprises a displacement adjustment structure, the second end of the transmission solid member is connected to the middle frame through the displacement adjustment structure, and the displacement adjustment structure is configured to increase a relative displacement between the transmission solid member and the middle frame when the transmission structure drives the middle frame to move.

16. The foldable apparatus according to claim 15, wherein the displacement adjustment structure comprises a first gear and a second gear that are meshed with each other, the first gear is meshed with a rack disposed on the second end of the transmission solid member, and the second gear is meshed with a rack disposed on the middle frame; and wherein the second gear comprises first teeth arranged in sequence and second teeth arranged in sequence, and the first teeth and the second teeth have a same axial center; the first gear is meshed with the first teeth, and the rack disposed on the middle frame is meshed with the second teeth; and a distance between the first tooth and an axial center of the second gear is smaller than a distance between the second tooth and the axial center of the second gear.

17. The foldable apparatus according to claim 1, wherein the rotating holder is rotatably connected to the spindle assembly through a rotating connector; and wherein the spindle assembly comprises a first rotating shaft, and the rotating connector rotates around the first rotating shaft; and the rotating connector overlaps with the transmission structure in a radial direction of the first rotating shaft.

18. The foldable apparatus according to claim 1, wherein the rotating holder is rotatably connected to the spindle assembly through a rotating connector;

wherein the spindle assembly comprises a first rotating shaft, and the rotating connector rotates around the first rotating shaft; and wherein the rotating connector and the transmission structure are arranged in an axial direction of the first rotating shaft.

19. The foldable apparatus according to claim 1, wherein the middle frame has a first fixed point, and the rotating holder has a second fixed point; and wherein, in the unfolding state, a distance between the first fixed point and the second fixed point is defined as $L_7$; wherein in the folding state, a distance between the first fixed point and the second fixed point is defined as $L_8$; wherein $L_7 > L_8$.

20. A foldable apparatus configured to support a flexible display screen, the foldable apparatus comprising:

a spindle assembly; and two rotating components;

wherein the foldable apparatus comprises an unfolding state and a folding state, the two rotating components are located at two sides of the spindle assembly in the unfolding state, and the two rotating components are stacked in the folding state:

wherein at least one of the two rotating components is a first rotating component comprising a middle frame, a rotating holder, and a transmission structure; and the rotating holder is rotatably connected to the spindle assembly, the middle frame is located at a side of the rotating holder away from the spindle assembly, the middle frame and the rotating holder are configured to slide in parallel, the transmission structure comprises one end connected to the spindle assembly and another end connected to the middle frame, and the middle frame is configured to adhere to the flexible display screen;

wherein, when the first rotating component rotates relative to the spindle assembly, the transmission structure moves relative to the rotating holder and drives the middle frame to slide in parallel relative to the rotating holder:

wherein one of the two rotating components is the first rotating component, and another rotating component of the two rotating components comprises a main body and an auxiliary sliding plate; the main body is rotatably connected to the spindle assembly; the main body and the auxiliary sliding plate are stacked, and the auxiliary sliding plate is configured to slide in parallel relative to the main body; and a side of the auxiliary sliding plate away from the main body is configured to adhere to the flexible display screen; and wherein a side of the main body close to the auxiliary sliding plate is provided with a first groove, a side of the auxiliary sliding plate close to the main body is provided with a protrusion, and the protrusion extends into the first groove; and a spring is disposed in the first groove, the spring is located at a side of the protrusion close to the spindle assembly, and the spring is in a contracted state; or wherein the spindle assembly is provided with a third groove, the third groove extends in an extension direction of the spindle assembly, and the third groove is configured to accommodate a stylus.

21. The foldable apparatus according to claim 20, wherein the main body further comprises a second groove communicating with the first groove and exposing a part of the protrusion; and wherein the second groove is located at a side of the main body away from the auxiliary sliding plate; or the second groove is located on an end surface of the main body, and the end surface of the main body intersects a plane of the auxiliary sliding plate.

22. The foldable apparatus according to claim 1, wherein any one of the two rotating components is the first rotating component.

23. An electronic device, comprising:

a flexible display screen; and a foldable apparatus for supporting the flexible display screen, wherein the foldable apparatus comprises:

a spindle assembly; and two rotating components;

wherein the foldable apparatus comprises an unfolding state and a folding state, the two rotating components are located at two sides of the spindle assembly in the unfolding state, and the two rotating components are stacked in the folding state;

wherein at least one of the two rotating components is a first rotating component comprising a middle frame, a rotating holder, and a transmission structure; and the rotating holder is rotatably connected to the spindle assembly, the middle frame is located at a side of the rotating holder away from the spindle assembly, the middle frame and the rotating holder are configured to slide in parallel, the transmission structure has one end connected to the spindle assembly and another end connected to the middle frame, and the middle frame is configured to adhere to the flexible display screen;

wherein, when the first rotating component rotates relative to the spindle assembly, the transmission structure moves relative to the rotating holder and drives the middle frame to slide in parallel relative to the rotating holder; and wherein the transmission structure comprises a pipe and a filler located in the pipe; wherein the filler is in a flowing state; wherein the pipe comprises a first end facing the spindle assembly, and a second end facing the middle frame: wherein the middle frame is at least partially embedded in the second end of the pipe and operably associated with the filler and is configured to slide relative to the pipe; and wherein the spindle assembly is at least partially embedded in the first end of the pipe and operably associated with the filler and is configured to slide relative to the pipe; or wherein the transmission structure comprises a transmission solid member, the transmission solid member comprises a first end fixedly connected to a first fixing portion of the spindle assembly and a second end connected to the middle frame, and at least the first end of the transmission solid member is flexible; and wherein the spindle assembly comprises a first rotating shaft, the rotating holder is rotatably connected to the first rotating shaft, and the first fixing portion is fixedly connected to the first rotating shaft.

24. The electronic device according to claim 23, wherein the flexible display screen further adheres to the spindle assembly.

25. The electronic device according to claim 23, wherein, when the foldable apparatus is in the folding state, the flexible display screen is located at an outer side of the foldable apparatus.

\* \* \* \* \*